March 26, 1963    H. E. KENNEDY    3,083,290
GAS SHIELDED METAL ARC WELDING TORCH
Filed Aug. 28, 1956
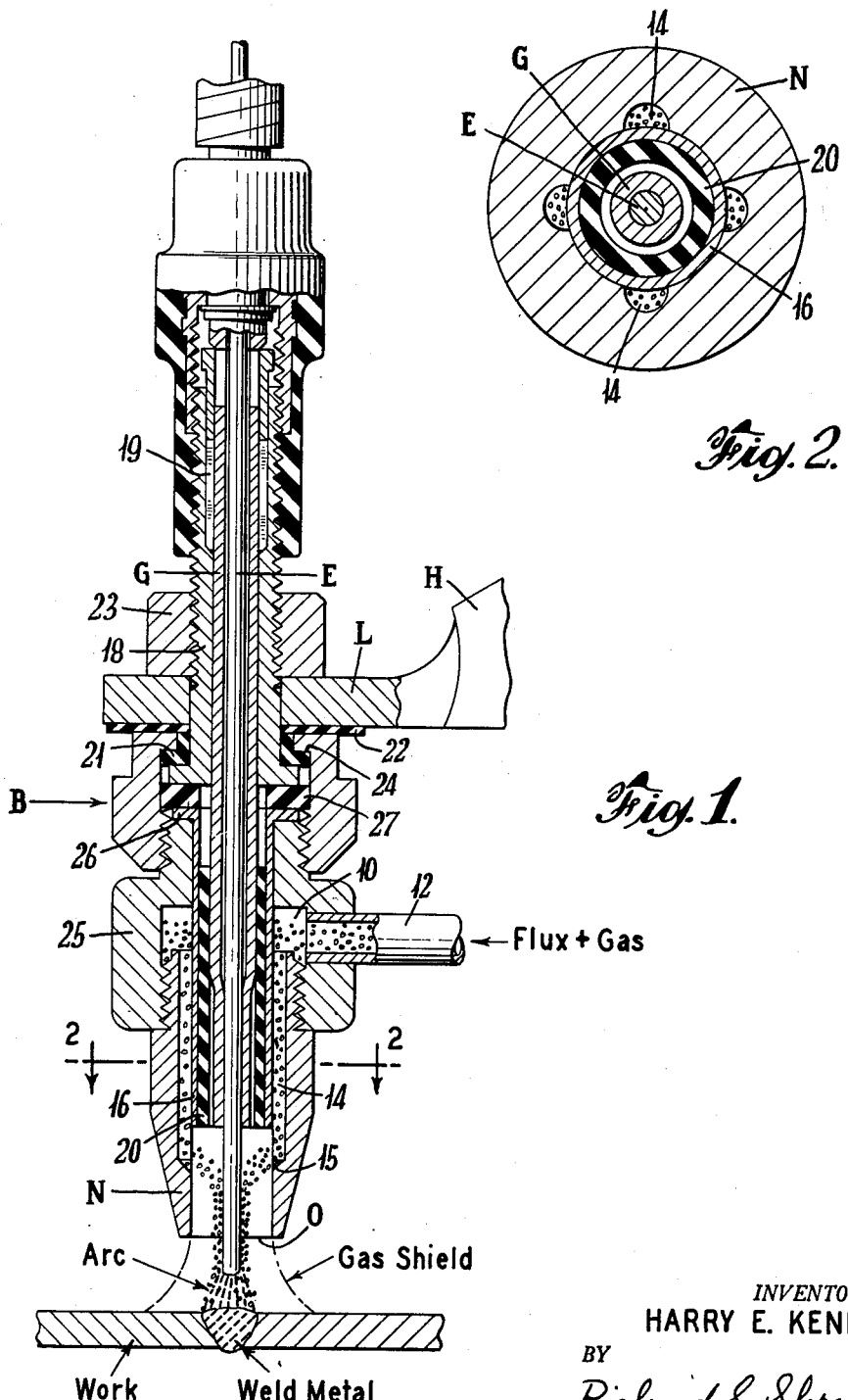
INVENTOR.
HARRY E. KENNEDY
BY
Richard S. Shreve, Jr
ATTORNEY

United States Patent Office 3,083,290
Patented Mar. 26, 1963

3,083,290
GAS SHIELDED METAL ARC WELDING TORCH
Harry E. Kennedy, Berkeley, Calif., assignor to Union Carbide Corporation, a corporation of New York
Filed Aug. 28, 1956, Ser. No. 606,648
11 Claims. (Cl. 219—130)

This invention relates to gas shielded metal arc welding torches and methods, and more particularly to torches and methods of this character in which a consumable wire electrode is fed through a guide tube in the torch, powdered welding composition is suspended in the shielding gas, and the shielding gas passes through a gas directing nozzle as disclosed in my copending application Serial No. 481,906, filed January 14, 1955, now abandoned, of which this application is in part a continuation, and on which this invention is an improvement.

The main objects of the invention are to provide uniform distribution of the gas-borne powder, and to protect the torch from abrasion by the gas-borne powder.

When the powdered material is magnetic, further objects are to insulate the stream of gas-borne powder from the current-carrying guide tube, and to direct the gas-borne powder inwardly below the guide tube at an angle to the inner surface of the gas directing nozzle to cause at least a portion of the powder to adhere to the welding wire coming out of the guide tube while the shielding gas passes on out through the nozzle discharge orifice.

In the drawing:

FIGURE 1 is a vertical axial section through a gas shielded metal arc torch according to, and for carrying out the method of the preferred embodiment of the present invention; and FIGURE 2 is a horizontal section taken along the line 2—2 of FIG. 1.

The torch shown in the drawing comprises a torch body B in which is mounted a wire guide tube G through which passes an electrode wire E. Electric welding current is supplied to the guide tube G by a lead-in conductor L provided with an insulating handle H. Surrounding the lower portion of the guide tube G is a gas directing nozzle N concentric with the guide tube and extending therebelow to a discharge orifice O.

According to the present invention the torch is constructed and arranged for passing powder-laden gas down along and outside of the guide tube G toward the discharge orifice O. In the form shown the upper portion of the guide tube G is surrounded by an annular distribution chamber 10, to which powder-laden gas is supplied by an inlet conduit 12. Below the chamber 10, the torch is provided with longitudinal distribution passages 14 leading from the chamber 10 and equally spaced around and outside of the guide tube G and extending therebelow toward the discharge orifice O.

The passages 14 are preferably semicircular flutes formed in the upper portion of the inner wall of the nozzle N. The lower ends of the passages 14 terminate below the bottom of the guide tube G in inclined deflectors 15 for directing the powder inwardly against the electrode wire coming from the guide tube G, to adhere to the electrode wire and be carried thereby into the weld puddle, while the carrier gas proceeds therearound on out through the discharge orifice O to shield the arc and weld puddle.

Surrounding the guide tube G inside of the annular chamber 10 and inside the portions of the passages 14 above the bottom of the guide tube is an insulator sleeve 20, which insulates the gas-borne powder from the energized guide tube G. Longitudinally coextensive with the insulator sleeve 20 is an insulator shield 16 surrounding the insulation to protect it from abrasive action of the gas-borne powder and also the radiant heat from the arc zone.

In the form shown, a part of the body B is formed by a wire guide tube holder 18, having a bore in which the guide tube G is held by a collet 19. The holder 18 is inserted through a holder insulating bushing 21 and a body insulating washer 22. Then the holder 18 is inserted from the bottom through the bore of the body B and through the lead-in L. A lock nut 23 screwed on the threaded top of the holder 18 clamps the lead-in L against the washer 22, and clamps the bushing 21 between the head of the holder and an annular shoulder 24 in the body B.

Another part of the body B is formed by a powder adaptor 25, in which the annular chamber 10 is preferably formed, and to which the gas inlet conduit 12 is connected. The adaptor 25 is provided with a threaded top which screws into the bottom of the body bore. The shield 16 has an external flange 26 resting on the top of the adaptor 25, which together with a shield insulating washer 27, is clamped between the adaptor 25 and the head of the holder 18.

The nozzle N preferably has a threaded top which screws into the bottom of the bore of the adaptor 25. Between the flutes 14 the nozzle bore snugly receives the insulator shield 16 to separate the longitudinal passages for the powder carrying gas.

What is claimed is:

1. Gas shielded metal arc welding torch comprising a torch body, an electrode wire guide tube mounted in said body, means for supplying electric welding current to said guide tube, a gas directing nozzle concentric with said guide tube and extending therebelow to a discharge orifice, means for passing powder-laden gas down along and outside of said guide tube toward said discharge orifice, and means below said guide tube and above said discharge orifice and inclined with respect to the inner surface of said nozzle for deflecting the down coming gas-borne powder inwardly toward the wire coming out of said guide tube.

2. Gas shielded metal arc welding torch comprising a torch body, an electrode wire guide tube mounted in said body, means for supplying electric welding current to said guide tube, a gas directing nozzle concentric with said guide tube and extending therebelow to a discharge orifice, means for passing magnetic powder-laden gas down along and outside of said guide tube toward said discharge orifice, an insulating sleeve surrounding said guide tube to insulate the same from the magnetic powder borne by the carrier gas toward the discharge orifice and deflectors below said guide tube and above said discharge orifice and inclined with respect to the inner surface of said nozzle for directing the down coming gas-borne powder inwardly toward the wire coming out of said guide tube.

3. Gas shielded metal arc welding torch comprising a torch body, an electrode wire guide tube mounted in said body, means for supplying electric welding current to said guide tube, a gas directing nozzle concentric with said guide tube and extending therebelow to a discharge orifice, means for passing magnetic powder-laden gas down along and outside of said guide tube toward said discharge orifice, an insulating sleeve surrounding said guide tube to insulate the same from the magnetic powder borne by the carrier gas toward the discharge orifice, a shield surrounding said insulating sleeve to protect it from radiant heat from the arc zone and abrasive action of the powder, and means below the bottom of said guide tube and above said discharge orifice and inclined with respect to the inner surface of said nozzle for deflecting the down coming powder inwardly toward the wire coming out of said guide tube.

4. Gas shielded metal arc welding torch comprising a torch body, an electrode wire guide tube mounted in said body, means for supplying electric welding current to said guide tube, a gas directing nozzle concentric with said guide tube and extending therebelow to a discharge orifice, said nozzle having longitudinal passages formed therein above the bottom of said guide tube equally spaced therearound and extending therebelow toward said discharge orifice, means for supplying powder-laden gas to said longitudinal passages and deflectors at the bottoms of said passages inclined with respect to the inner surface of said gas directing nozzle for deflecting a portion of the powder inwardly against the wire coming out of said guide tube.

5. Gas shielded metal arc welding torch comprising a torch body, an electrode wire guide tube mounted in said body, means for supplying electric welding current to said guide tube, a gas directing nozzle concentric with said guide tube and extending therebelow to a discharge orifice, an annular distribution chamber surrounding said electrode wire guide tube, means for supplying powder-laden gas to said annular distribution chamber, longitudinal distribution passages leading from said annular distribution chamber and equally spaced around and outside of said electrode guide tube and extending therebelow toward said discharge orifice and deflectors at the bottoms of said passages inclined with respect to the inner surface of said nozzle for deflecting the powder inwardly toward the wire coming out of said guide tube.

6. Gas shielded metal arc torch comprising a torch body, an electrode wire guide tube mounted in said body, means for supplying electric welding current to said guide tube, a gas directing nozzle concentric with said guide tube and extending therebelow to a discharge orifice, an insulating sleeve surrounding said guide tube, an annular distribution chamber surrounding the upper portion of said insulating sleeve, means for supplying magnetic powder-laden gas to said annular distribution chamber, longitudinal distribution passages equally spaced around and outside of said insulating sleeve and extending from said annular distribution chamber down below said insulating sleeve, the bottoms of said passages being inclined inwardly with respect to the inner surface of said nozzle to cause at least a portion of the powder to adhere to the wire coming out of said guide tube.

7. Gas shielded metal arc welding torch comprising a torch body, an electrode wire guide tube mounted in said body, means for supplying electric welding current to said wire guide tube, a gas directing nozzle concentric with said electrode wire guide tube and extending therebelow to a discharge orifice, an annular distribution chamber surrounding said electrode wire guide tube, means for supplying magnetic powder-laden gas to said annular distribution chamber, longitudinal distribution passages leading from said annular distribution chamber and equally spaced around and outside of said electrode guide tube and extending therebelow toward said discharge orifice, and means below said guide tube inclined with respect to the inner surface of said gas directing nozzle for deflecting the powder from said passages inward toward the wire coming out of said guide tube to be carried by magnetic attraction to the wire while the carrier gas proceeds therearound out through said discharge orifice.

8. Method of electric arc welding with a moving wire consuming electrode connected to a source of welding current, wherein said electrode is fed through a guide tube toward a metal workpiece connected to said source and an arc is struck between said electrode and said workpiece, and a gaseous medium is simultaneously fed in an annular stream through the discharge orifice of a gas directing nozzle to shield the arc, characterized by continuously suspending in said shielding gas powdered welding composition, passing said powder-laden gas into an annular chamber surrounding said guide tube, taking off powder-laden gas from said chamber and dividing it into separate branch streams, passing said separate branch streams in respective paths parallel to said guide tube and angularly distributed therearound, deflecting said separate branch streams inwardly beyond the end of said guide tube and above said discharge orifice and at an angle to the general direction of said annular gas stream to project at least a part of the gas-borne powder against the electrode issuing from said guide tube while combining the carrier gas from said branch streams into said annular stream of shielding gas for the arc.

9. Gas shielded metal arc welding torch comprising a torch body, an electrode wire guide tube mounted in said body, means for supplying electric welding current to said guide tube, a gas directing nozzle concentric with said guide tube and extending therebelow to a discharge orifice, means for passing gas laden with powder containing at least a component of adherent material down along and outside of said guide tube towards said discharge orifice, and means below said guide tube and above said discharge orifice and inclined with respect to the inner surface of said nozzle for deflecting the down coming gas borne powder inwardly toward the wire coming out of said guide tube to cause at least a part thereof to adhere to the wire.

10. Method of electric arc welding with a moving wire consuming electrode connected to a source of welding current, wherein said electrode is fed through a guide tube toward a metal workpiece connected to said source and an arc is struck between said electrode and said workpiece, and a gaseous medium is simultaneously fed in an annular stream through the discharge orifice of a gas directing nozzle to shield the arc, characterized by continuously suspending in said shielding gas powdered welding composition, passing said powder laden gas along said guide tube, deflecting said powder laden gas inwardly beyond the end of said guide tube and above said discharge orifice and at an angle to the general direction of said annular gas stream to project at least a part of the gas borne powder against the electrode wire issuing from said guide tube while the carrier gas passes on through said discharge orifice to shield the arc.

11. Method of electric arc welding with a moving wire consuming electrode connected to a source of welding current, wherein said electrode is fed through a guide tube toward a metal workpiece connected to said source and an arc is struck between said electrode and said workpiece, and a gaseous medium is simultaneously fed in an annular stream through the discharge orifice of a gas directing nozzle to shield the arc, characterized by continuously suspending in said shielding gas powdered welding composition containing a magnetic component, passing said powder laden gas along said guide tube and angularly distributed therearound, deflecting said powder laden gas inwardly beyond the end of said guide tube and above said discharge orifice and at an angle to the general direction of said annular gas stream to project at least a part of the gas borne powder against the electrode wire issuing from said guide tube to cause at least a part thereof to adhere to the wire while the carrier gas passes on through said discharge orifice to shield the arc.

References Cited in the file of this patent

UNITED STATES PATENTS

| | | |
|---|---|---|
| 2,544,711 | Mikhalapov | Mar. 13, 1951 |
| 2,606,267 | McElrath | Aug. 5, 1952 |
| 2,659,796 | Anderson | Nov. 17, 1953 |
| 2,694,764 | Muller | Nov. 16, 1954 |
| 2,727,125 | Muller | Dec. 13, 1955 |